(12) United States Patent
Chimenti et al.

(10) Patent No.: US 12,238,374 B2
(45) Date of Patent: *Feb. 25, 2025

(54) METHODS AND APPARATUS FOR A WINDOW-METRIC RULE

(71) Applicant: The Nielsen Company (US), LLC, New York, NY (US)

(72) Inventors: Paul Chimenti, Tampa, FL (US); David J. Kurzynski, South Elgin, IL (US); Denis Voytenko, Oldsmar, FL (US); Joshua Zinzer, Chicago, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,898

(22) Filed: Jan. 12, 2023

(65) Prior Publication Data

US 2023/0224537 A1    Jul. 13, 2023

Related U.S. Application Data

(63) Continuation of application No. 17/344,638, filed on Jun. 10, 2021, now Pat. No. 11,558,662, which is a
(Continued)

(51) Int. Cl.
*H04N 21/442* (2011.01)
*G06F 16/48* (2019.01)

(52) U.S. Cl.
CPC ..... *H04N 21/44213* (2013.01); *G06F 16/489* (2019.01)

(58) Field of Classification Search
CPC ......... H04N 21/44213; H04N 21/2407; H04N 21/2408; H04N 21/4508; H04N 21/6582;
(Continued)

(56) References Cited

U.S. PATENT DOCUMENTS 7,039,928 B2    5/2006    Kamada et al.
7,260,823 B2    8/2007    Schlack et al.
(Continued)

FOREIGN PATENT DOCUMENTS

CN    102006605 A    4/2011
CN    113383555 A    9/2021
(Continued)

OTHER PUBLICATIONS

International Searching Authority, "International Search Report," in connection with International Patent Application No. PCT/US2019/066607, issued Apr. 20, 2020, 3 pages.
(Continued)

*Primary Examiner* — Oschta I Montoya

(57) ABSTRACT

Methods, apparatus, systems and articles of manufacture are disclosed for a window-metric rule for return path data (RPD). In some examples, a media monitor is to determine a first count of a number of devices in a first household that reported RPD for a first day, and compare the first count to a current window-metric, the current window-metric associated with a window of time for the first household, the window of time associated with a content provider and having N number of days. In some examples, the media monitor is also to exclude the RPD from the first household for the first day when the first count does not satisfy the current window-metric, and generate a media exposure report using the RPD from the first household for the first day when the first count satisfies the current window-metric, independent of if the first household has heartbeat data available.

20 Claims, 7 Drawing Sheets

Related U.S. Application Data continuation of application No. 16/222,771, filed on Dec. 17, 2018, now Pat. No. 11,039,207.

(58) Field of Classification Search
CPC .............. G06F 16/489; G06Q 30/0201; G06Q 30/0241

See application file for complete search history.

(56) References Cited

U.S. PATENT DOCUMENTS

| | | | |
|---|---|---|---|
| 7,945,120 | B2 | 5/2011 | Tanaka |
| 7,954,120 | B2 | 5/2011 | Roberts et al. |
| 8,484,511 | B2 | 7/2013 | Tidwell et al. |
| 8,863,166 | B2 | 10/2014 | Harsh et al. |
| 8,904,419 | B2 * | 12/2014 | Vinson ............... H04N 21/6582 725/14 |
| 8,931,023 | B2 | 1/2015 | Talbert |
| 9,003,436 | B2 * | 4/2015 | Tidwell .............. H04N 21/4667 709/224 |
| 9,215,022 | B2 | 12/2015 | Rowe et al. |
| 9,838,754 | B2 | 12/2017 | Goli et al. |
| 10,075,756 | B1 | 9/2018 | Karunanithi et al. |
| 10,277,944 | B2 * | 4/2019 | Venetucci .............. H04H 60/64 |
| 11,039,207 | B2 | 6/2021 | Chimenti et al. |
| 11,558,662 | B2 | 1/2023 | Chimenti et al. |
| 2008/0222672 | A1 | 9/2008 | Piesing |
| 2009/0259518 | A1 | 10/2009 | Harvey et al. |
| 2012/0260280 | A1 | 10/2012 | Harsh et al. |
| 2013/0014148 | A1 * | 1/2013 | Vinson ............... H04N 21/2407 725/14 |
| 2013/0339991 | A1 | 12/2013 | Ricci |
| 2014/0013345 | A1 | 1/2014 | Vinson et al. |
| 2015/0181268 | A1 | 6/2015 | Navin |
| 2015/0181269 | A1 | 6/2015 | McMillan |
| 2015/0358677 | A1 * | 12/2015 | Papa ................ H04N 21/25816 725/14 |
| 2016/0249098 | A1 * | 8/2016 | Pecjak ............. H04N 21/44224 |
| 2018/0152760 | A1 | 5/2018 | Venetucci et al. |
| 2018/0152762 | A1 | 5/2018 | Sullivan et al. |
| 2022/0038773 | A1 | 2/2022 | Chimenti et al. |

FOREIGN PATENT DOCUMENTS

| | | |
|---|---|---|
| EP | 3900375 A1 | 10/2021 |
| WO | 2020131737 A1 | 6/2020 |

OTHER PUBLICATIONS

International Searching Authority, "Written Opinion," in connection with International Patent Application No. PCT/US2019/066607, issued Apr. 20, 2020, 5 pages.

United States Patent and Trademark Office, "Notice of Allowance," in connection with U.S. Appl. No. 16/222,771, issued Feb. 11, 2021, 7 pages.

United States Patent and Trademark Office, "Non-Final Rejection," in connection with U.S. Appl. No. 16/222,771, issued Oct. 29, 2020, 8 pages.

International Bureau, "International Preliminary Report on Patentability," in connection with International Patent Application No. PCT/US2019/066607, issued Jun. 16, 2021, 6 pages.

United States Patent and Trademark Office, "Non-Final Rejection," in connection with U.S. Appl. No. 17/344,638, issued Jun. 15, 2022, 7 pages.

Canadian Patent Office, "Examiner's Report," in connection with Canadian Patent Application No. 3,123,409, Issued Aug. 31, 2022, 4 pages.

United States Patent and Trademark Office, "Notice of Allowance and Fee(s) Due," in connection with U.S. Appl. No. 17/344,638, issued Oct. 3, 2022, 7 pages.

European Patent Office, "Extended European Search Report," in connection with European Patent Application No. 19899371.9, issued Oct. 6, 2022, 7 pages.

The State Intellectual Property Office of People's Republic of China, "The First Office Action," in connection with Chinese Patent Application No. 201980089536.6, issued Nov. 16, 2022, 21 pages.

United States Patent and Trademark Office, "Notice of Allowance and Fee(s) Due (PTOL-85)," in connection with U.S. Appl. No. 17/344,638, issued Nov. 16, 2022, 2 pages.

United States Patent and Trademark Office, "Corrected Notice of Allowability," in connection with U.S. Appl. No. 17/344,638, issued Dec. 16, 2022, 2 pages.

* cited by examiner

METHODS AND APPARATUS FOR A WINDOW-METRIC RULE

RELATED APPLICATIONS

This patent arises from a continuation of U.S. patent application Ser. No. 17/344,638 (now U.S. Pat. No. 11,558, 662), filed on Jun. 10, 2021, and titled "METHODS AND APPARATUS FOR A WINDOW-METRIC RULE," which is a continuation of U.S. patent application Ser. No. 16/222, 771 (now U.S. Pat. No. 11,039,207), filed on Dec. 17, 2018, and titled "METHODS AND APPARATUS FOR A WINDOW-METRIC RULE." Priority to U.S. patent application Ser. No. 17/344,638 and U.S. patent application Ser. No. 16/222,771 is claimed. U.S. patent application Ser. No. 17/344,638 and U.S. patent application Ser. No. 16/222,771 are hereby incorporated herein by reference in their respective entireties.

FIELD OF THE DISCLOSURE

This disclosure relates generally to a window-metric rule.

BACKGROUND

In recent years, media content can be delivered to and presented by a wide variety of content presentation devices, such as desktop computers, laptop computers, tablet computers, personal digital assistants, smartphones, etc.

Media providers and/or other entities such as, for example, advertising companies, broadcast networks, etc. are often interested in the viewing, listening, and/or media behavior of audience members and/or the public in general. The media usage and/or exposure habits of monitored audience members, as well as demographic data about the audience members, are collected and used to statistically determine the size and demographics of an audience of interest.

DETAILED DESCRIPTION

Figure 1:
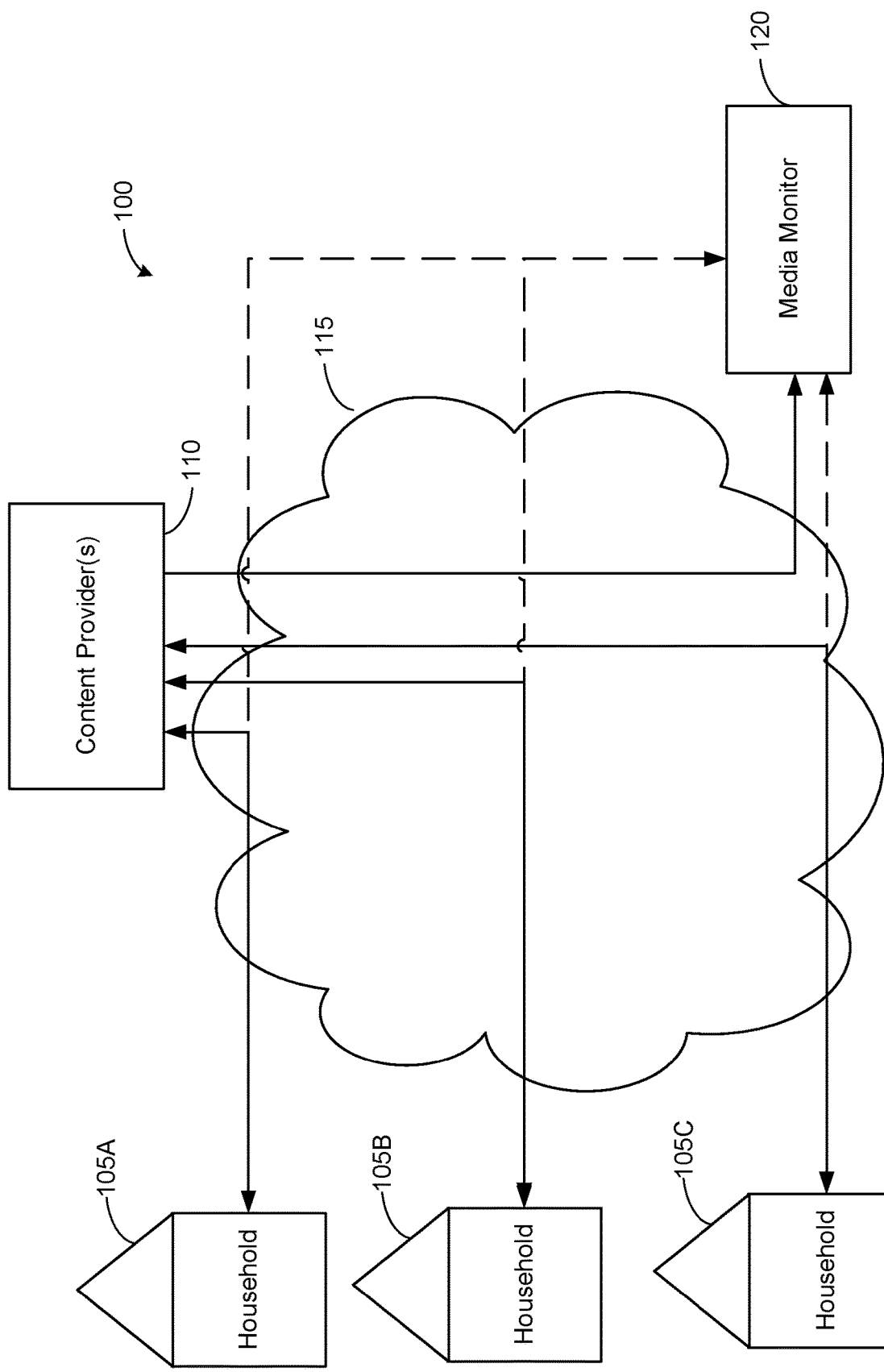
FIG. 1 is a block diagram of an example system to implement a window-metric rule for return path data (RPD).

When monitoring households that utilize set top boxes (STBs) to receive media from content providers, a determination is made if the return path data (RPD) from a household for a given day should be retained as data used for audience projections. Return path data is a superset of set-top box data.

Set-Top Box data includes all the data collected by the set-top box. STB data may include, for example, tuning events and/or commands received by the STB (e.g., power on, power off, change channel, change input source, start presenting media, pause the presentation of media, record a presentation of media, volume up/down, etc.). STB data may additionally or alternatively include commands sent to a content provider by the STB (e.g., switch input sources, record a media presentation, delete a recorded media presentation, the time/date a media presentation was started, the time a media presentation was completed, etc.), heartbeat signals, or the like. The Set-top box data may additionally or alternatively include a household identification (e.g. a household ID) and/or a STB identification (e.g. a STB ID).

Return path data includes any data receivable at a content provider from the return path from a content consumer site. As such, return path data includes set-top box data. Return path data may additionally or alternatively include data from any other consumer device with network access capabilities (e.g., via a cellular network, the internet, other public or private networks, etc.). For example, return path data may include any or all of linear real time data from an STB, guide user data from a guide server, click stream data, key stream data (e.g., any click on the remote—volume, mute, etc.), interactive activity (such as Video On Demand) and any other data (e.g., data from middleware). Return path data can additionally or alternatively be from the network (e.g., via Switched Digital software) and/or any cloud-based data (such as a remote server DVR) from the cloud.

The term "intab" indicates that the RPD is retained/used for the given day and the term "outtab" indicates that the RPD is not used (e.g., discarded) for the given day.

Prior techniques for deciding when to retain/use the RPD include monitoring a heartbeat from the STBs in the household. A heartbeat indicates that an STB is operating properly. In the past, the RPD from a particular household was excluded (e.g., outtab) if heartbeat signals were not received from each STB of the particular household on a given day. Typically, content providers receive the heartbeat data from the STB s and forwarded the heartbeat data to an audience measurement entity (AME). However, some content providers do not report heartbeat data, and/or some STBs do not report heartbeats. Without the heartbeat data, some way of determining if all STBs in a household are functioning properly is needed.

Methods, apparatus and articles of manufacture to implement a window-metric rule for RPD solves the problem of being unable to rely on heartbeat data by using a window of time (e.g. a number of days over which the RPD is evaluated) to determine when to retain/use the RPD from the household for a given day. The window of time may be referred to as a "sliding window" as the window of time moves by a day for each day that passes.

In some examples, a configurable sized window is used to determine whether to retain a household's RPD for a given day, the window specifying the number of past days (e.g., 7 days, 14 days, etc.) over which STB usage in the household is to be analyzed. For example, if the window is 5 days long and the given day for the RPD is Friday, the window would start at Monday and end on Friday. On the next day (e.g. Saturday), the window would start on Tuesday and end on Saturday (e.g., the window "slid" one day forward).

For each day in the window, a count of the STBs (e.g. a STB-count) for the household is determined, the STB-count is the number of unique/different STBs in the household for which RPD is reported. Next, the window-metric for the window is determined. In some examples the window-metric is the most frequency occurring STB-count in the window of time. In other examples, the window-metric is an average of the STB-counts in the window of time. The STB-count for the given day is compared to the window-metric. If the STB-count does not satisfy (e.g. is less than) the window-metric, the RPD for the household is excluded (e.g., not used) from the RPD measurement panel (e.g. outtab). Otherwise, if the STB-count satisfies (e.g., is greater than or equal to) the window-metric, the RPD for the household is retained (e.g., used) in the RPD measurement panel (e.g. intab). The window allows the STB-count to adapt on a daily basis (e.g., to account for changes in the number of STBs in a given house over time, changes in usage patterns, such as when college students return home from school, etc.). For example, in the fall when students head to collage, the number of days in the sliding window may be reduced, to more quickly accommodate the reduction in usage of the student's STB.

An example apparatus disclosed herein to implement a window-metric rule for RPD includes an example media monitor that receives RPD. In some examples, the media monitor receives the RPD from one or more content providers. In other examples, the media monitor may receive the RPD from multiple households. The RPD may include a household identification (e.g. a household ID) and a STB identification (e.g. a STB ID) for the RPD reported from each STB. As such, the RPD can be traced to a specific STB in a specific household.

The example media monitor may receive RPD from any number of content providers. An example household sorter in the media monitor sorts the RPD by households for each content provider. An example RPD analyzer in the example media monitor, analyzes the RPD for a first day from a content provider to determine a first STB-count, the RPD includes data from a first household. The example RPD analyzer compares the first STB-count to a current window-metric, the window of time having a number of days. The example RPD analyzer excludes/discards the RPD for the household for the first day when the first STB-count does not satisfy (e.g. is less than) the current window-metric and retains/selects the RPD for the household for the first day when the first STB-count satisfies (e.g., is greater than or equal to) the current window-metric.

The example RPD analyzer may also include an example window-metric calculator to update the current window-metric. The example window-metric calculator updates the current window-metric by deleting an oldest STB-count from the window of time, aging the remaining STB-counts in the window of time by a day, and adding the first STB-count as a newest STB-count to the window of time. In some examples, the window-metric calculator then updates the window-metric as the most frequently occurring STB-count in the updated window of time. In other examples, the window-metric calculator then updates the window-metric as the average of the STB-counts in the updated window of time.

FIG. 1 is a block diagram of an example system 100 to implement a window-metric rule for RPD. The example system 100 includes households 105A, 105B, 105C, content provider 110, media monitor 120, and network 115. Each of the households 105A, 105B, 105C is coupled to the content provider 110 over network 115 (e.g., the Internet).

The content provider 110 sends media to the households. As used herein, the term "media" includes any type of content and/or advertisement delivered via any type of distribution medium. Thus, media includes television programming or advertisements, radio programming or advertisements, movies, web sites, streaming media, etc. In some examples, content provider receives RPD from the households 105A, 105B, 105C. In other examples, the media monitor 120 receives the RPD from the households 105A, 105B, 105C over network 115.

Content provider 110 sends the RPD from the households 105A, 105B, 105C to the example media monitor 120 over network 115. The example media monitor 120 analyzes the RPD to implement a window-metric rule for RPD as describe in further detail below with respect to FIG. 3.

Figure 2:
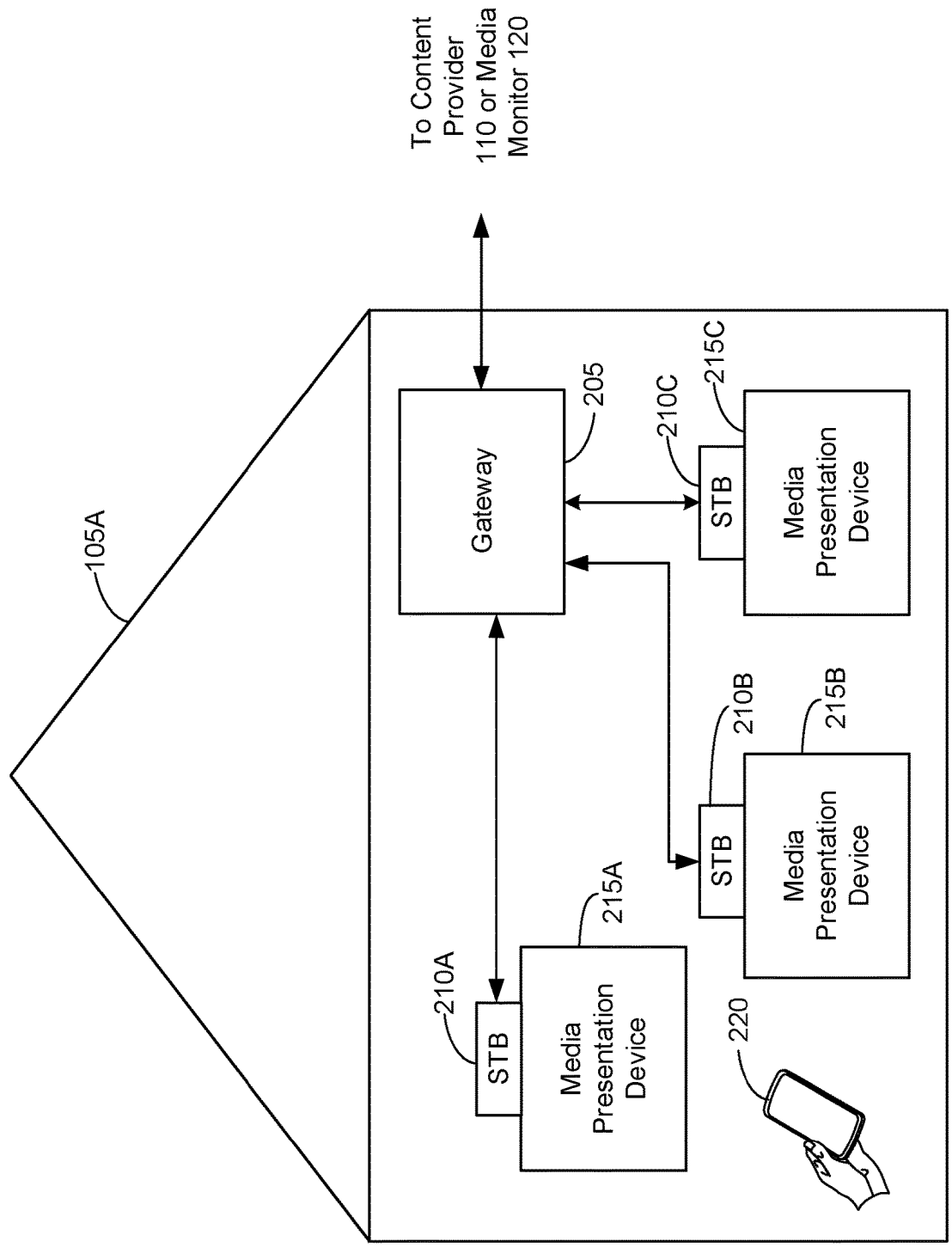
FIG. 2 is a block diagram showing additional details of an example household of FIG. 1.

FIG. 2 is a block diagram showing additional details of an example household of FIG. 1. Household 105A includes a gateway 205, set top boxes (STBs) 210A, 210B and 210C, and media presentation devices 215A, 215B, 215C and 220. Gateway 205 is coupled to the content provider 110 and may be connected to media monitor 120 of FIG. 1 over network 115 of FIG. 1. In some examples, gateway 205 distributes signals/media from content provider 110 to respective STBs 210A, 210B, 210C inside household 105A and sends RPD from the STBs to the content provider 110. In other examples, Gateway 205 may send the RPD directly to the media monitor.

STBs 210A, 210B and 210C are coupled to respective media presentation devices 215A, 215B, 215C. The example media presentation devices 215A, 215B, 215C of the illustrated example shown in FIG. 2 are devices that retrieves media from their respective STBs 210A, 210B, 210C for presentation. In the example of FIG. 2 there are three STBs and three corresponding media presentation devices 215A, 215B, 215C. However, any number of STBs/media presentation devices could be used in household 105A. Household 105A may also include any other types of media presentation devices, for example media presentation device 220 (e.g. a cell phone).

In some examples, the media presentation devices 215A, 215B, 215C are capable of directly presenting media (e.g., via a display) while, in other examples, the media presentation devices 215A, 215B, 215C presents the media on separate media presentation equipment (e.g., speakers, a display, etc.). Thus, as used herein "media presentation devices" may or may not be able to present media without assistance from a second device. Media presentation devices are typically consumer electronics. For example, the media presentation devices 215A, 215B, 215C of the illustrated example may be a television, and thus, would be capable of directly presenting media (e.g., via an integrated and/or connected display and speakers). Any type(s) and/or number (s) of media presentation device(s) may be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may be used.

Figure 3:
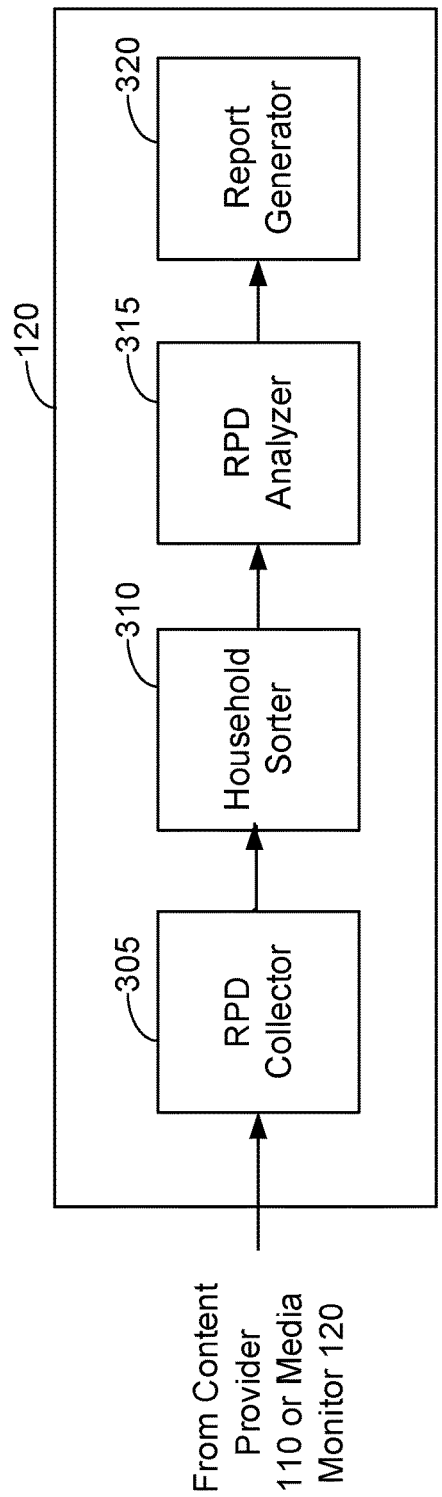
FIG. 3 is a block diagram showing additional details of an example media monitor of FIG. 1.

FIG. 3 is a block diagram showing additional details of an example media monitor of FIG. 1. Media monitor 120 includes an example RPD collector 305, an example household sorter 310, an example RPD analyzer 315 and an example report generator 320. In some examples, the RPD collector 305 receives RPD from content provider 110 across network 115 of FIG. 1. In other examples, the RPD collector 305 receives RPD directly from households, for example Households 105A-C, across network 115 of FIG. 1.

In the example of FIG. 1, only one content provider is shown. However, RPD collector 305 may receive RPD from any number of content providers. The RPD collector 305 may receive RPD from the content provider 110 hourly, daily or weekly, etc. The RPD collector 305 passes the RPD from respective content providers to the household sorter 310.

The household sorter 310 sorts the RPD by households for each content provider. The household sorter 310 passes the sorted RPD to the RPD analyzer 315.

RPD analyzer 315 analyzes the RPD for a given household from a content provider for a first day to determine if the RPD will be retained/used or discarded/excluded. The example RPD analyzer 315 discards/excludes the RPD from the household for the first day when a first STB-count does not satisfy (e.g. is less than) a current window-metric and retains/selects the RPD from the household for the first day when the first STB-count satisfies (e.g., is greater than or equal to) the current window-metric. Using the window-metric for the comparison to the first STB-count to determine which RPD is retained is defined as the window-metric rule. When the RPD from a household is retained, the RPD is said to have passed the window-metric rule. The RPD analyzer 315 analyses each household in the RPD for the first day to determine if the RPD from the household will be intab (e.g. retained) or outtab (e.g. excluded or not used) as discussed in more detail below with respect to FIG. 4.

The RPD analyzer 315 passes the retained/selected (e.g. intab) RPD from the households to the example report generator 320. The example report generator 320 tabulates the retained/selected RPD and creates a report used to credit media exposures from the content provider as reported by the STBs in the households. Using the window-metric rule overcomes the limitation for determining if RPD is to be retained using heartbeat data from the STBs. As such, using the window-metric rule increases the number of households that have RPD retained (e.g., RPD that does not have heartbeat data, but pass the window mode rule, are retained).

Figure 4:
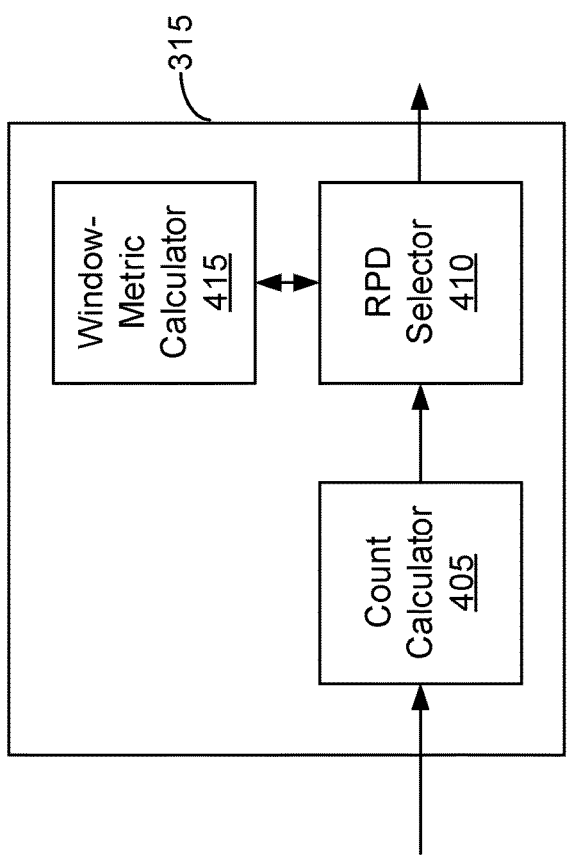
FIG. 4 is a block diagram showing additional details of an example RPD analyzer of FIG. 3.

FIG. 4 is a block diagram showing additional details of an example RPD analyzer of FIG. 3. The example RPD analyzer 315 includes an example count calculator 405, and example RPD selector 410 and an example window-metric calculator 415. The example count calculator 405 analyzes the RPD for a given household from a content provider for a first day to determine a first STB-count. In some examples, the first STB-count is the number of different set top boxes in the household that reported RPD. By using the number of different set top boxes in the RPD for a given household, instead of tracking the specific STB IDs, the household can update or replace a STB without affecting the results of the RPD analysis.

The example RPD selector 410 compares the first STB-count for the household to a current window-metric for the household. In some examples, the current window-metric is the most frequently occurring STB-count that occurs during a window of time associated with the content provider. In other examples, the current window-metric is the average of the STB-counts that occurs during a window of time associated with the content provider.

In some examples, the window of time associated with the content provider has an adjustable number of days. The example RPD selector 410 discards/excludes the RPD from the household for the first day when the first STB-count does not satisfy (e.g. is less than) the current window-metric and retains/selects the RPD from the household for the first day when the first STB-count satisfies (e.g., is greater than or equal to) the current window-metric. Using the window-metric for the comparison to the first STB-count to determine which RPD is retains is defined as the window-metric rule. When the RPD from a household is retained, the RPD is said to have passed the window-metric rule. The RPD analyzer 315 analyses each household in the RPD for the first day to determine if the RPD from the household will be intab (e.g. retained) or outtab (e.g. discarded/excluded).

The example RPD selector 410 sends the first STB-count for a household to the window-metric calculator 415 and request an updated window-metric from the window-metric calculator 415 before analyzing the RPD from that household for the first day. The window-metric calculator 415 updates the window-metric for a household by deleting an oldest STB-count from the household in a sliding window datastore, aging the remaining STB-counts from the household in the sliding window datastore by a day, and adding the first STB-count from the household as a newest STB-count to the sliding window datastore. In some examples, the current window-metric calculator 415 then updates the current window-metric as the most frequently occurring STB-count in the updated sliding window datastore. In other examples, the current window-metric calculator 415 updates the current window-metric as the average of the STB-counts in the updated sliding window datastore.

While an example manner of implementing the media monitor 120 of FIG. 1 is illustrated in FIG. 3, one or more of the elements, processes and/or devices illustrated in FIG. 3 may be combined, divided, re-arranged, omitted, eliminated and/or implemented in any other way. Further, the example RPD collector 305, the example RPD analyzer 315, the window-metric calculator 415, the report generator 320 and/or, more generally, the example media monitor 120 of FIG. 1 may be implemented by hardware, software, firmware and/or any combination of hardware, software and/or firmware. Thus, for example, any of the example RPD collector 305, the example RPD analyzer 315, the window-metric calculator 415, the report generator 320 and/or, more generally, the example media monitor 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, RPD collector 305, the example RPD analyzer 315, the window-metric calculator 415, and/or the report generator 320 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media monitor 120 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
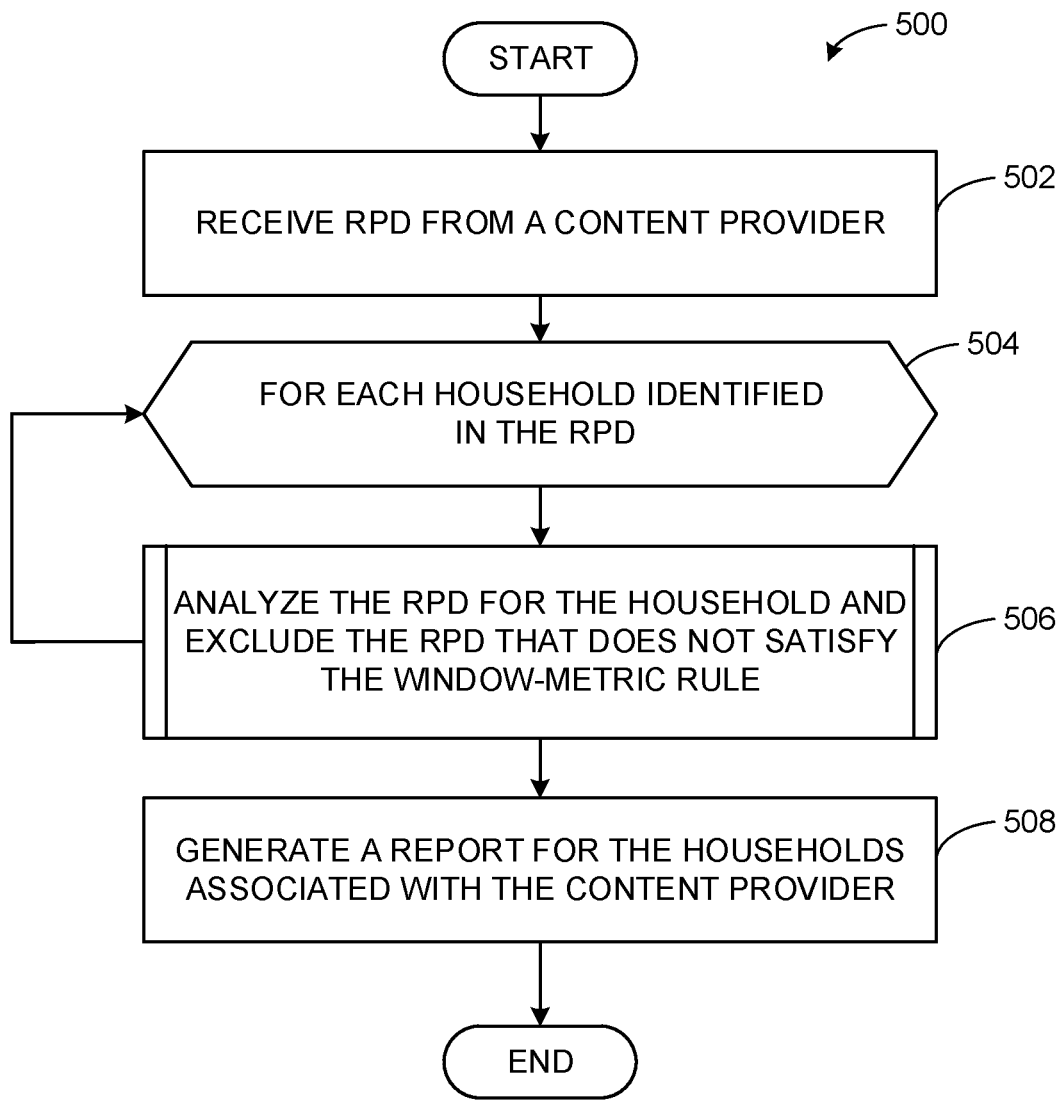
FIG. 5 is a flowchart representative of machine readable instructions that may be executed to implement the example media monitor of FIG. 3.
Figure 6:
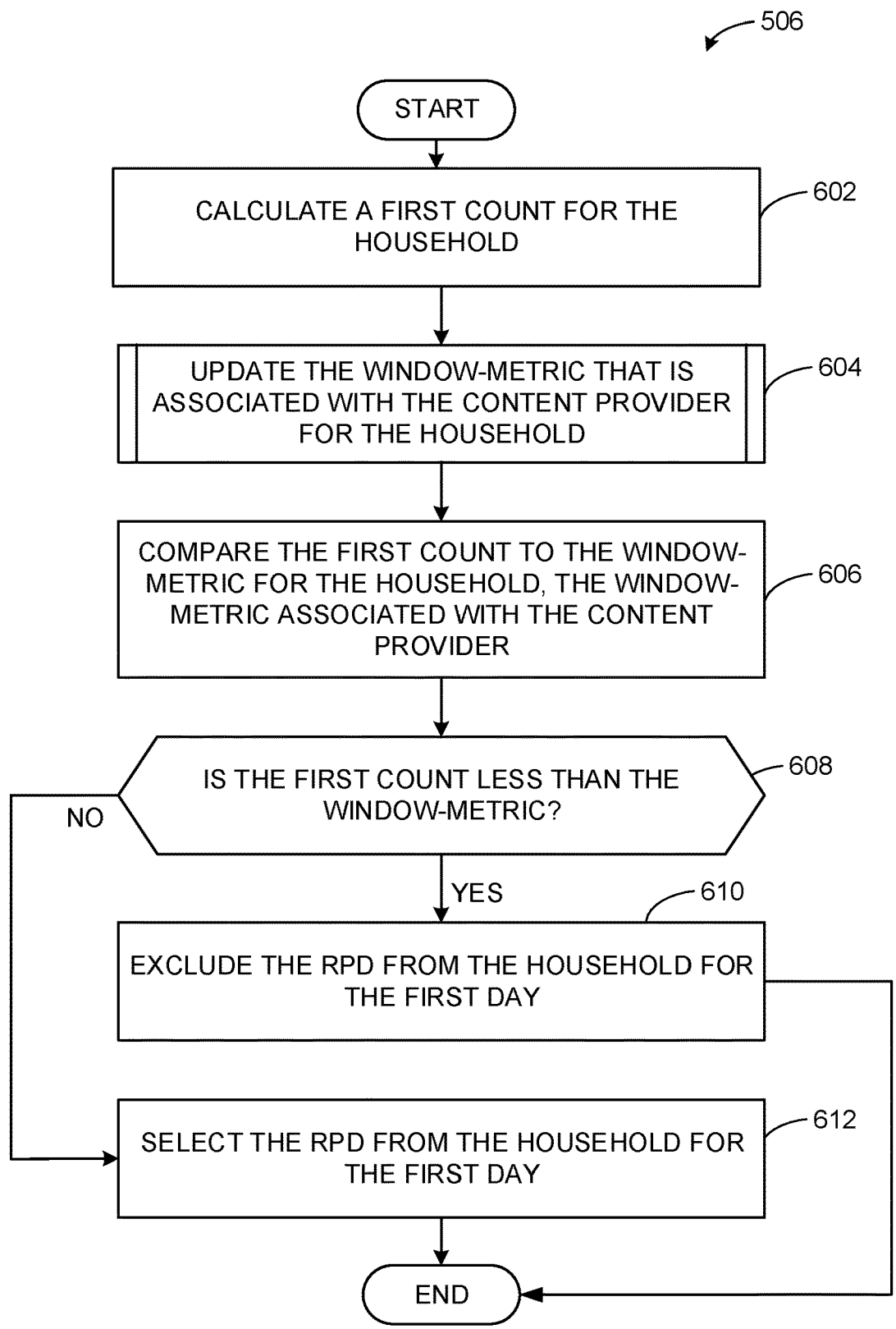
FIG. 6 is a flowchart representative of machine readable instructions that may be executed to implement block 506 of FIG. 5.
Figure 7:
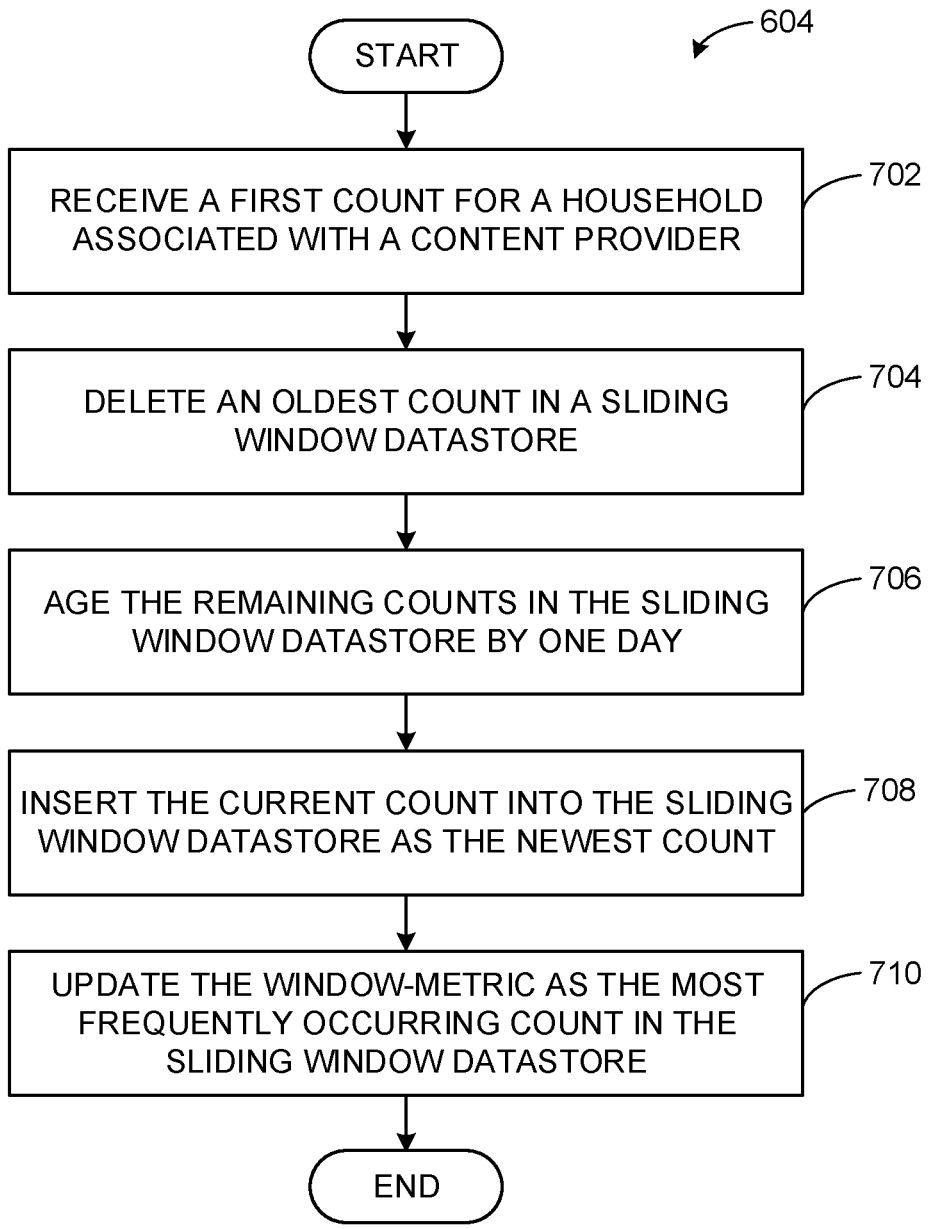
FIG. 7 is a flowchart representative of machine readable instructions that may be executed to implement block 604 of FIG. 6.

A flowchart representative of example hardware logic, machine readable instructions, hardware implemented state machines, and/or any combination thereof for implementing the media monitor 120 of FIG. 3 is shown in FIGS. 5, 6 and 7. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 5, 6 and 7, many other methods of implementing the example media monitor 120 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5, 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 5 is a flowchart representative of machine readable instructions which may be executed to implement the example media monitor 120 of FIG. 3. The example machine readable instructions 500 of FIG. 5 begin execution at block 502, where the RPD collector 305 receives RPD. In some examples, the RPD collector 305 receives RPD from the content provider 110 of FIG. 1. In other examples, the RPD collector 305 receives RPD from the households 105A-C of FIG. 1. Only one content provider is shown in FIG. 1. However, RPD collector 305 may receive RPD from any number of content providers. RPD collector 305 passes the received RPD to the example household sorter 310.

Flow continues in block 504, where the household sorter 310 of FIG. 3 sorts the RPD by households for each content provider. The household sorter 310 passes the sorted RPD for each household to the RPD analyzer 315 of FIG. 3.

Flow continues in block 506, where the RPD analyzer 315 analyzes the RPD from the identified household and discards/excludes the RPD from the household when the window-metric rule is not met, as described in more detail with respect to FIG. 6. Flow returns to block 504 when another household in the RPD from the content provider has not been analyzed. When all the households in the RPD have been analyzed, flow continues in block 508.

In block 508, report generator 320 receives the intab RPD from RPD analyzer 315. The intab RPD is the RPD from the households that pass the window-metric rule (e.g. the RPD that is retained). The report generator 320 generates a media exposure report by tabulating the media events from the intab RPD for the content provider.

FIG. 6 is a flowchart representative of machine readable instructions which may be executed to implement block 506 of FIG. 5. Flow begins at block 602 where the count calculator 405 of FIG. 4 determines a first STB-count for the identified household. The first STB-count for a household is the number of different STBs identified in the RPD from the household for the first day. By using the number of different set top boxes in the RPD for a given household, instead of tracking the specific STB IDs, the household can update or replace a STB without affecting the results of the RPD analysis. The count calculator 405 passes the first STB-count to the RPD selector 410 of FIG. 4

Flow continues in bock 604 where the RPD selector 410 passes the first STB-count to the window-metric calculator 415 of FIG. 4. The window-metric calculator 415 updates the current window-metric as described in more detail below in regard to FIG. 7 and passes the updated current window-metric back to the RPD selector 410.

Flow continues in block 606 where the RPD selector 410 compares the first STB-count for the household to the current window-metric for the household, where the window-metric for the household is associated with the content provider. A comparison between the first STB-count and the window-metric is made in box 608. When the first STB-count is less that the window-metric, flow continues at block 610, where the RPD analyzer 315 excludes/discards (e.g.

outtabs) the household's RPD for the first day. Flow then returns to block 508 of FIG. 5.

When the first STB-count satisfies (e.g., is greater than or equal to) the window-metric, flow continues at block 612, where the RPD analyzer 315 retains/selects (e.g. intabs) the household's RPD for the first day. As such, RPD that is retained/selected is said to have passed the window-metric rule. Flow then returns to block 508 of FIG. 5.

FIG. 7 is a flowchart representative of machine readable instructions which may be executed to implement block 604 of FIG. 6. Flow starts at block 702. In block 702, the window-metric calculator 415 receives the first STB-count for the identified household and the identity of the associated content provider.

Flow continues in block 704, where the window-metric calculator 415 of FIG. 4 deletes an oldest STB-count from a sliding window datastore for the household. The sliding window datastore is associated with the identified content provider 110.

A household may receive content from multiple content providers. As such, the household may have multiple sliding window datastores, where each datastore is associated with a different content provider. Each sliding window datastore has a number of days N, where N is adjustable. The number N may be adjusted based on the identity of content provider, for example 7 days for a first content provider, and 14 days for a second content provider. The number N may also be adjusted based on the time of year.

The number of days N in the window for a given content provider associated with the household may initially be set as a minimum number of days required to obtain a stable retention rate for the RPD for the content provider. A stable retention rate is defined as a percentage of the number of households whose RPD is retained, where the percentage stays within a band of retention rates, bounded by a maximum retention rate and a minimum retention rate, over a period of time (e.g., a month, two months, a quarter, etc.). For example, a retention rate that stays between 80% and 84% over a two-month period for a set number of days N in the sliding window would be considered a stable retention rate. An initial "burn in" period may be required to fully fill the sliding window datastore before beginning the measurements for a stable retention rate.

Flow continues in block 706, where the window-metric calculator 415 ages the remaining STB-counts in the sliding window datastore by one day.

Flow continues in block 708 where the window-metric calculator 415 inserts the first STB-count into the sliding window datastore as the newest STB-count.

Flow continues in block 710, where the window-metric calculator 415 updates the window-metric as the most frequently occurring STB-count in the updated sliding window datastore. In some examples, the window-metric calculator 415 updates the window-metric as the average of the STB-counts in the updated sliding window datastore. The window-metric calculator 415 returns the updated window-metric to the RPD selector 410. Flow then returns to block 606 in FIG. 6.

Figure 8:
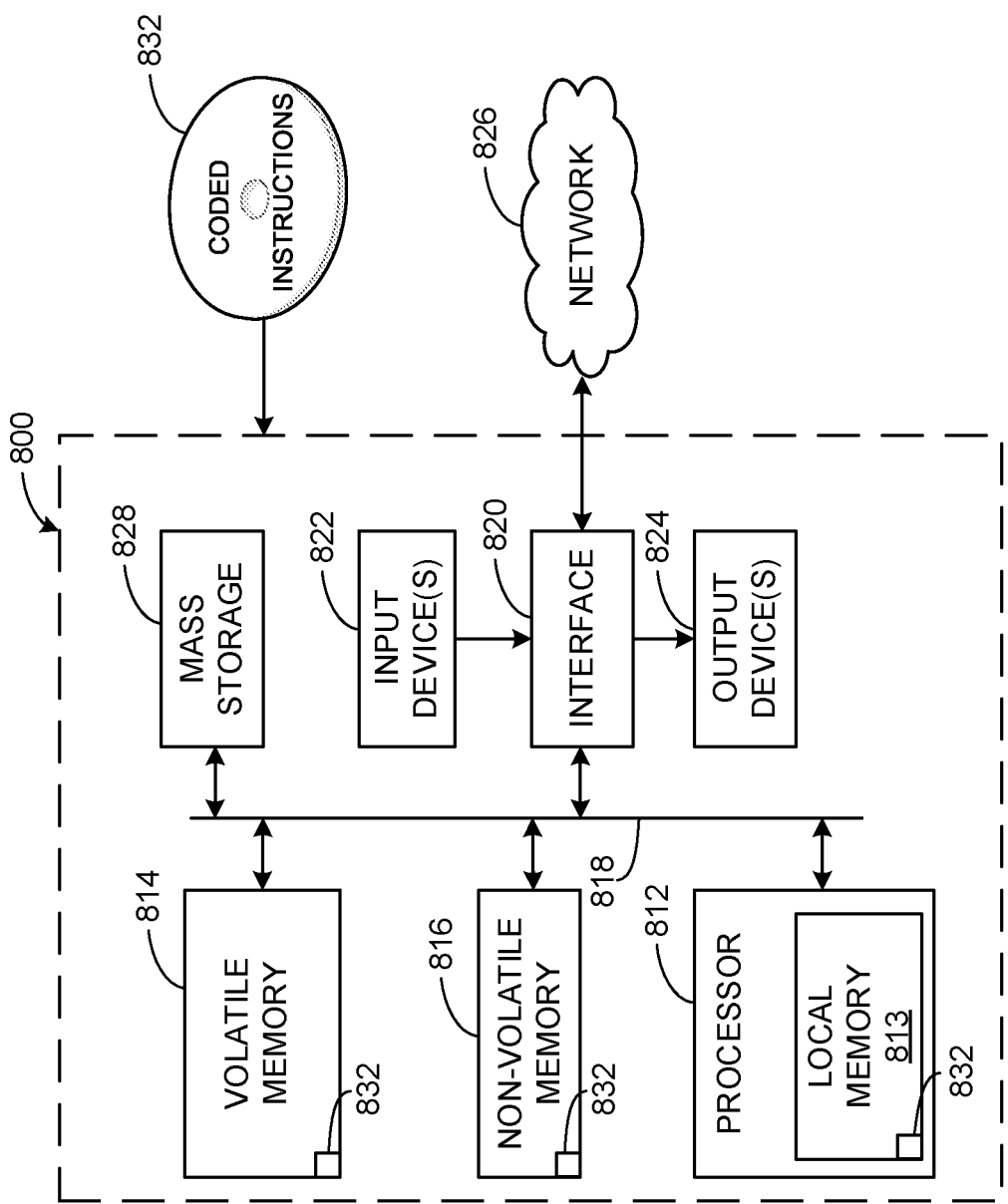
FIG. 8 is a block diagram of an example processing platform structured to execute the instructions of FIGS. 5-7 to implement the example media monitor of FIG. 1.

FIG. 8 is a block diagram of an example processor platform 800 structured to execute the instructions of FIGS. 5, 6 and 7 to implement the apparatus of FIG. 3. The processor platform 800 can be, for example, a server, a personal computer, a workstation, a self-learning machine (e.g., a neural network, an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements FIGS. 5, 6 and 7.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 4, 5, and 6 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that improve the retention rate for RPD for households viewing media using STBs. The improved retention rate for RPD increases the accuracy for reported media events. The disclosed methods, apparatus and articles of manufacture improve the efficiency of using a computing device by replacing inconsistent and/or missing heartbeat data from STBs with RPD from the STBs. In recent tests, missing data (e.g. RPD that were discarded) due to missing heartbeats was reduced from 22% to 8% using the window-metric rule. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a processor; and
a non-transitory computer-readable storage medium, having stored thereon program instructions that, upon execution by the processor, cause performance of a set of operations comprising:
obtaining, from a monitored site, return path data of a plurality of physical households from a plurality of media devices including at least one of an Internet-enabled mobile device or at least one smart television, the plurality of media devices coupled to a plurality of set-top boxes (STBs), wherein each respective portion of the return path data includes a respective household identifier for a respective physical household of the plurality of physical households and a STB identifier of the plurality of STBs;
for each physical household of the plurality of physical households and based on the respective household identifier:
sorting the return path data into the respective portions of the return path data according to the respective household identifier;
computing a first count of the plurality of media devices that reported the respective portion of the return path data from the respective STB of the monitored site during a first time period; and
determining whether to prevent the respective portion of the return path data reported from the respective STB of the monitored site during the first time period from being used to credit media exposure for the first time period based on comparison of the first count of the plurality of media devices to a value, the value based on one or more prior counts of the plurality of media devices that reported the respective portion of the return path data from of the monitored site during respective one or more prior time periods before the first time period.

2. The apparatus of claim 1, wherein the set of operations further comprising:
preventing the respective portion of the return path data reported from the respective STB of the monitored site during the first time period from being used to credit media exposure for the first time period when the first count of the plurality of media devices is less than the value; and using the respective portion of the return path data reported from the respective STB of the monitored site during the first time period to credit media exposure for the first time period when the first count of the plurality of media devices is greater than or equal to the value.

3. The apparatus of claim 1, wherein the set of operations further comprising setting the value to be a most frequently occurring value of the one or more prior counts.

4. The apparatus of claim 1, wherein the set of operations further comprising setting the value to be an average of the one or more prior counts.

5. The apparatus of claim 1, wherein the one or more prior time periods are included in a time window, and the programmable circuitry is to configure the time window based on a media provider for which media exposure is to be credited for the first time period.

6. The apparatus of claim 1, wherein the set of operations further comprising updating the value for a second time period after the first time period based on the first count of the plurality of media devices.

7. The apparatus of claim 6, wherein updating the value, the set of operations further comprising:
deleting an oldest one of the one or more prior counts of the plurality of media devices; and
computing the value based on the first count of the plurality of media devices and remaining ones of the one or more prior counts of the plurality of media devices.

8. At least one non-transitory computer readable medium comprising computer readable instructions to cause one or more processors to at least:
obtain, from a monitored site, return path data of a plurality of physical households from a plurality of media devices including at least one of an Internet-enabled mobile device or at least one smart television, the plurality of media devices coupled to a plurality of set-top boxes (STBs), wherein each respective portion of the return path data includes a respective household identifier for a respective physical household of the plurality of physical households and a STB identifier of the plurality of STBs;
for each physical household of the plurality of physical households and based on the respective household identifier:
sort the return path data into the respective portions of the return path data according to the respective household identifier;
compute a first count of the plurality of media devices that reported the respective portion of the return path data from the respective STB of the monitored site during a first time period; and
determine whether to prevent the respective portion of the return path data reported from the respective STB of the monitored site during the first time period from being used to credit media exposure for the first time period based on comparison of the first count of the plurality of media devices to a value, the value based on one or more prior counts of the plurality of media devices that reported the respective portion of the return path data of the monitored site during respective one or more prior time periods before the first time period.

9. The at least one non-transitory computer readable medium of claim 8, wherein the instructions are to cause the one or more processors to:
prevent the respective portion of the return path data reported from the respective STB of the monitored site during the first time period from being used to credit media exposure for the first time period when the first count of the plurality of media devices is less than the value; and use the respective portion of the return path data reported from the respective STB of the monitored site during the first time period to credit media exposure for the first time period when the first count of the plurality of media devices is greater than or equal to the value.

10. The at least one non-transitory computer readable medium of claim 8, wherein the instructions are to cause the one or more processors to set the value to be a most frequently occurring value of the one or more prior counts.

11. The at least one non-transitory computer readable medium of claim 8, wherein the instructions are to cause the one or more processors to set the value to be an average of the one or more prior counts.

12. The at least one non-transitory computer readable medium of claim 8, wherein the one or more prior time periods are included in a time window, and the instructions are to cause the one or more processors to configure the time window based on a media provider for which media exposure is to be credited for the first time period.

13. The at least one non-transitory computer readable medium of claim 8, wherein the instructions are to cause the one or more processors to update the value for a second time period after the first time period based on the first count of the plurality of media devices.

14. The at least one non-transitory computer readable medium of claim 13, wherein to update the value, the instructions are to cause the one or more processors to:

delete an oldest one of the one or more prior counts of the plurality of media devices; and compute the value based on the first count of the plurality of media devices and remaining ones of the one or more prior counts of the plurality of media devices.

15. A method comprising:

obtaining, from a monitored site, return path data of a plurality of physical households from a plurality of media devices including at least one of an Internet-enabled mobile device or at least one smart television, the plurality of media devices coupled to a plurality of set-top boxes (STBs), wherein each respective portion of the return path data includes a respective household identifier for a respective physical household of the plurality of physical households and a STB identifier of the plurality of STBs;

for each physical household of the plurality of physical households and based on the respective household identifier:

sorting the return path data into the respective portions of the return path data according to the respective household identifier;

computing, by executing with one or more processors, a first count of the plurality of media devices that reported the respective portion of the return path data from the respective STB of the monitored site during a first time period; and determining, by executing with the one or more processors, whether to prevent the respective portion of the return path data reported from the respective STB of the monitored site during the first time period from being used to credit media exposure for the first time period based on comparison of the first count of the plurality of media devices to a value, the value based on one or more prior counts of the plurality of media devices that reported the respective portion of the return path data of the monitored site during respective one or more prior time periods before the first time period.

16. The method of claim 15, further including:

preventing the respective portion of the return path data reported from the respective STB of the monitored site during the first time period from being used to credit media exposure for the first time period when the first count of the plurality of media devices is less than the value; and using the respective portion of the return path data reported from the respective STB of the monitored site during the first time period to credit media exposure for the first time period when the first count of the plurality of media devices is greater than or equal to the value.

17. The method of claim 15, further including setting the value to be a most frequently occurring value of the one or more prior counts or an average of the one or more prior counts.

18. The method of claim 15, wherein the one or more prior time periods are included in a time window, and further including configuring the time window based on a media provider for which media exposure is to be credited for the first time period.

19. The method of claim 15, further including updating the value for a second time period after the first time period based on the first count of the plurality of media devices.

20. The method of claim 19, wherein the updating of the value includes:

deleting an oldest one of the one or more prior counts of the plurality of media devices; and computing the value based on the first count of the plurality of media devices and remaining ones of the one or more prior counts of the plurality of media devices.

\* \* \* \* \*